(12) United States Patent
Jennings

(10) Patent No.: US 11,970,198 B2
(45) Date of Patent: Apr. 30, 2024

(54) FOLDING UTILITY CART ACCESSORY DEVICE

(71) Applicant: Cody Jennings, Savannah, GA (US)

(72) Inventor: Cody Jennings, Savannah, GA (US)

(*) Notice: Subject to any disclaimer, the term of this patent is extended or adjusted under 35 U.S.C. 154(b) by 109 days.

(21) Appl. No.: 17/357,495

(22) Filed: Jun. 24, 2021

(65) Prior Publication Data
US 2022/0105973 A1    Apr. 7, 2022

Related U.S. Application Data

(60) Provisional application No. 63/088,331, filed on Oct. 6, 2020.

(51) Int. Cl.
*B62B 3/00*    (2006.01)
*B62B 3/02*    (2006.01)

(52) U.S. Cl.
CPC .............. *B62B 3/005* (2013.01); *B62B 3/02* (2013.01)

(58) Field of Classification Search
CPC .. B62B 3/005; B62B 3/02; B62B 3/04; B62B 5/0003
See application file for complete search history.

(56) References Cited

U.S. PATENT DOCUMENTS

| | | | |
|---|---|---|---|
| 4,819,767 A * | 4/1989 | Laird | B62B 5/04 188/71.3 |
| 5,988,671 A | 11/1999 | Abelbeck et al. | |
| 7,578,400 B1 | 8/2009 | Hartman | |
| 7,963,530 B1 | 6/2011 | Garcia | |
| 8,465,031 B2 | 6/2013 | Coghill, Jr. | |
| 8,925,683 B1 * | 1/2015 | Gunsaullus | E06C 1/38 182/129 |
| 10,525,894 B1 | 1/2020 | Williamson | |
| 2015/0118006 A1 * | 4/2015 | Wallace-Riley | B62B 3/005 414/800 |
| 2018/0086358 A1 * | 3/2018 | Bacallao | B62B 3/005 |
| 2021/0221417 A1 * | 7/2021 | Cazares | B62B 3/106 |

* cited by examiner

*Primary Examiner* — James A Shriver, II
*Assistant Examiner* — Nicholas R. Kandas
(74) *Attorney, Agent, or Firm* — Boudwin Intellectual Property Law, LLC; Daniel Boudwin

(57) ABSTRACT

A folding utility cart accessory device includes a frame having a pair of vertical supports and an upper horizontal member extending between an upper end of each vertical support. A pair of support arms are attached to the frame. A first pair of fasteners are attached to a lower horizontal member that extends between each vertical support. A second pair of fasteners are attached to a lower end of each vertical support. The first pair of fasteners are configured to removably secure to an upper horizontal member of a folding utility cart frame. The second pair of fasteners are configured to removably secure to a vertical member of a folding utility cart frame. In this way, the frame can be removably secured to either the front end or rear end of a folding utility cart to provide additional storage options.

2 Claims, 6 Drawing Sheets

FOLDING UTILITY CART ACCESSORY DEVICE

CROSS REFERENCE TO RELATED APPLICATIONS

This application claims the benefit of U.S. Provisional Patent Application Ser. No. 63/088,331 filed on Oct. 6, 2020. The above identified patent application is herein incorporated by reference in its entirety to provide continuity of disclosure.

BACKGROUND OF THE INVENTION

The present invention relates to an accessory device that removably attaches to a folding utility cart. More specifically, the present invention provides a folding utility cart accessory device that can removably secure to either the front end or rear end of a folding utility cart to provide additional storage options, allowing the user to hang chairs or other objects from the device for easy transport with the utility cart.

Folding utility carts are often utilized during outdoor recreation to transport and store various items. For example, folding utility carts are commonplace at the beach, on camping trips, and in other outdoor settings. These folding utility carts typically include a collapsible frame that supports a flexible central storage area. The storage area can be filled with items for transport, and the cart can be collapsed for more compact storage when not in use.

While the collapsible or folding utility cart provides many advantages, it also has its share of disadvantages. Particularly, the folding utility cart is limited in the amount of storage it provides, because it typically only includes the open central storage area. Once this area is filled with items, it is no longer possible to secure any additional items to the folding utility cart. Additionally, the flexible central storage area is not suitable for certain items, such as bulkier or oddly shaped rigid items. For example, a chair stored within flexible central storage area will often distend the lining and warp the storage area, making it difficult or impossible to store additional items. Umbrellas or other longer items may poke into the material of the storage area and cause it to contact the ground or other surfaces, potentially damaging the utility cart. Additionally, fragile items placed within the storage area may be damaged since there is no means of securing or separating the fragile items within the storage area of the folding utility cart.

Some devices exist in the known art that provide accessories for folding utility carts. However, these devices have several drawbacks. Some of these devices are insertable into the storage area of the folding utility cart to provide organizational features within the main storage area. However, these devices fail to provide additional storage means, since the storage area provided by the cart is still limited to its main storage area. Other devices provide more generic accessory attachments for folding utility carts and do not address the lack of storage options.

In light of the folding utility carts and related accessory devices disclosed in the known art, it is submitted that the present invention substantially diverges in functional and structural elements from the prior art and consequently it is clear that there is a need in the art for an improvement to existing folding utility cart accessory devices, particularly with regards to addressing the lack of storage options present in conventional folding utility carts. In this regard the present invention substantially fulfills these needs.

SUMMARY OF THE INVENTION

In view of the foregoing disadvantages inherent in the known types of folding utility carts and related accessory devices now present in the known art, the present invention provides a new folding utility cart accessory device wherein the same can be utilized for providing additional storage solutions for folding utility carts that expand their storage options beyond their main storage area.

The folding utility cart accessory device generally includes a frame having a pair of vertical supports and an upper horizontal member extending between an upper end of each vertical support. A pair of support arms are attached to the frame, which allows users to hang chairs or other items from the frame. A first pair of fasteners are attached to a lower horizontal member extending between each vertical support, and a second pair of fasteners are attached to a lower end of each vertical support. The first pair of fasteners are configured to removably secure to an upper horizontal member of a folding utility cart frame, while the second pair of fasteners are configured to removably secure to a vertical member of the folding utility cart frame.

One object of the present invention is to provide a folding utility cart accessory device that can be secured to either the front end or rear end of a folding utility cart, allowing a user to select a desired mounting location or to use two devices simultaneously, with one device attached to each end of the cart, for additional storage.

Another object of the present invention is to provide a folding utility cart accessory device that includes collapsible support arms, allowing the device to be collapsed to a more compact configuration for storage when not in use.

A further object of the present invention is to provide a folding utility cart accessory device that includes multiple rows of horizontal members with retaining members on the upper end thereof, such that multiple items can be secured to the horizontal members by attaching individual items to each retaining member.

Yet another object of the present invention is to provide a folding utility cart accessory device that may be readily fabricated from materials that permit relative economy and are commensurate with durability.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
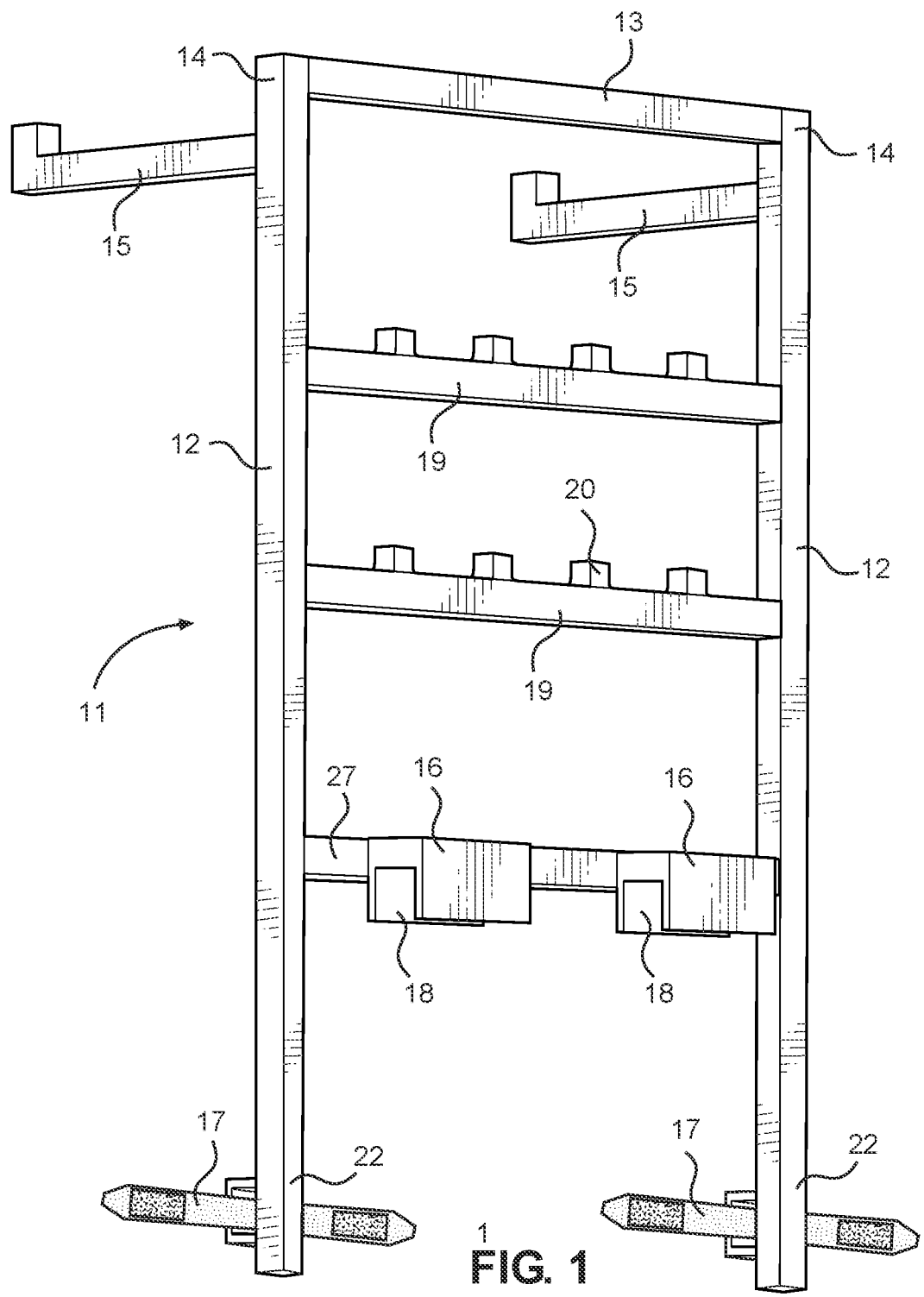
FIG. 1 shows a perspective view of an embodiment of the folding utility cart accessory device.

Reference is made herein to the attached drawings. Like reference numerals are used throughout the drawings to depict like or similar elements of the folding utility cart accessory device. For the purposes of presenting a brief and clear description of the present invention, the preferred embodiment will be discussed as used for providing a folding utility cart storage device that removably secures to a folding utility cart to provide additional storage options. The figures are intended for representative purposes only and should not be considered to be limiting in any respect.

Figure 2:
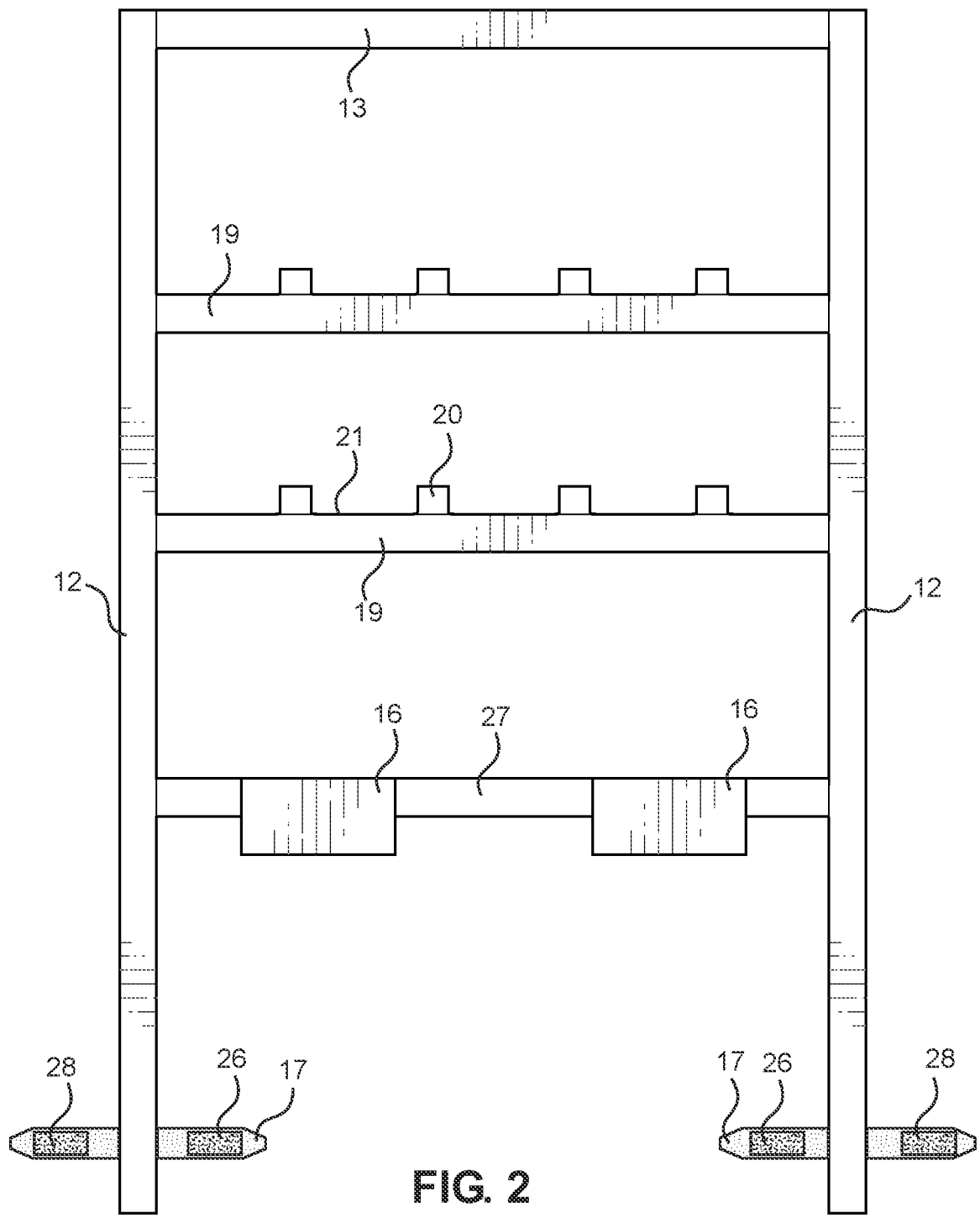
FIG. 2 shows a rear elevation view of an embodiment of the folding utility cart accessory device.

Referring now to FIGS. 1 and 2, there is shown a perspective view of an embodiment of the folding utility cart accessory device and a rear elevation view of an embodiment of the folding utility cart accessory device, respectively. The device includes a frame 11 defined by a pair of vertical supports 12 and an upper horizontal member 13 extending between and connecting the upper ends 14 of each vertical support 12. The upper horizontal member 13 provides structural strength and rigidity to the frame 11. The frame 11 also includes a pair of support arms 15. In the shown embodiment, the support arms 15 are attached to the vertical members 12 toward the upper end thereof. The support arms 15 provide a storage location to hang chairs, bags with straps, or other items.

A first pair of fasteners 16 are attached to a lower horizontal member 27 extending between each vertical support 12. In the shown embodiment, the first pair of fasteners 16 are hook shaped with an open lower end 18 that receives a portion of the folding utility cart's frame. In other embodiments, the first pair of fasteners 16 can include additional securement features, such as a spring-loaded clamp, as one example. A second pair of fasteners 17 are attached to a lower end 22 of each vertical support 12. In the shown embodiment, the second pair of fasteners 17 are straps that wrap around a portion of the frame of the folding utility cart. As shown in FIG. 2, the straps can be held in place via hook material 26 on one side of the strap removably connecting to loop material 28 on an opposing side of the strap. In other embodiments, other suitable fastening elements such as snaps, buckles, or the like may be attached to the straps. Further, while the straps are shown at as a fixed length, other embodiments may include straps that are adjustable in length.

In the shown embodiment, the frame 11 includes additional middle horizontal members 19 that extend across the vertical supports 12, such that they are positioned between the upper horizontal member 13 and the lower horizontal member 27. The total number of middle horizontal members 19 may vary. The middle horizontal members may also include additional retaining members 20. The retaining members 20 allow users to attach or hang items from the horizontal members 19. In the shown embodiment, the retaining members 20 extend or project upwardly from an upper surface 21 of each horizontal member 19. This positioning of the retaining members 20 keeps the width of the overall frame 11 more narrow for more compact storage when not in use.

Figure 3:
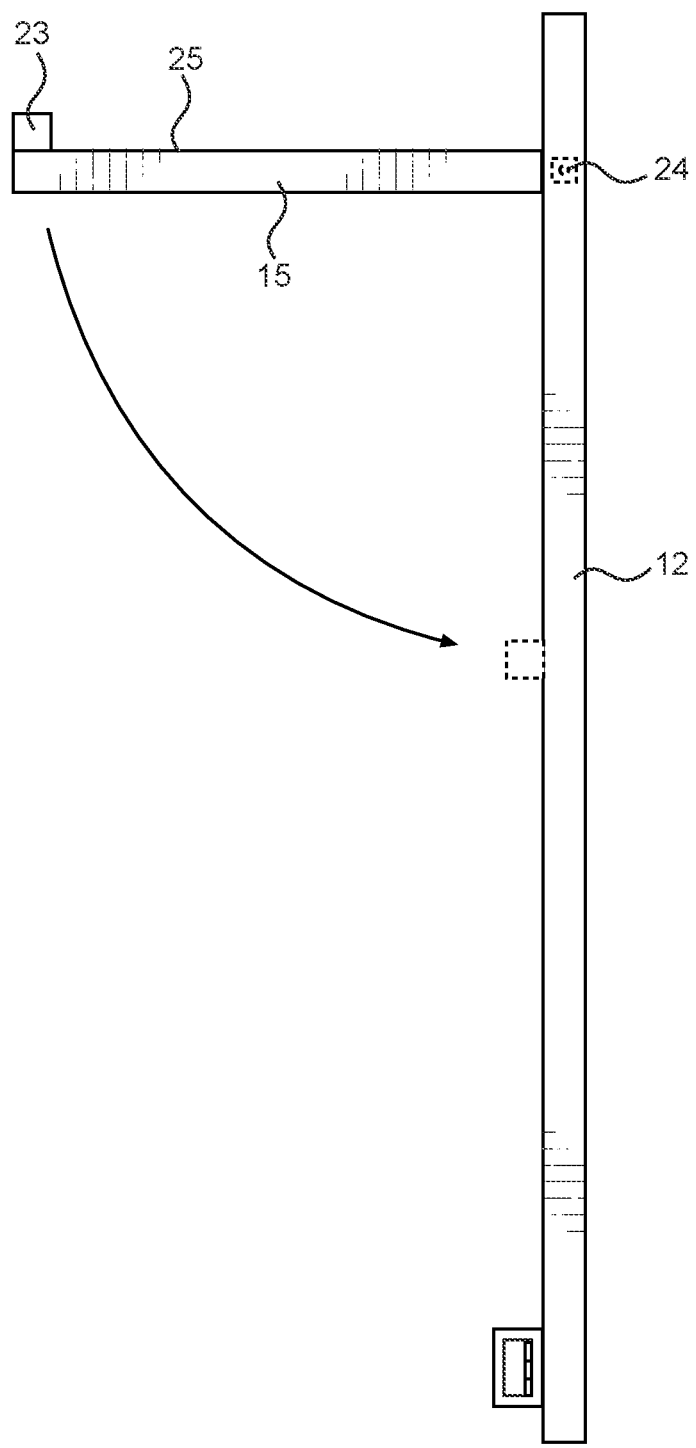
FIG. 3 shows a side elevation view of an embodiment of the folding utility cart accessory device.

Referring now to FIG. 3, there is shown a side elevation view of an embodiment of the folding utility cart accessory device. The support arm 15 may also include a retaining member 23 attached to a distal end thereof, which may also be a projection extending upwardly from an upper surface 25 of the support arm 15. This provides a horizontal support for hanging (See FIG. 6, (61)) chairs or other items, while the retaining member 23 prevents such items from slipping off the support arm 15. In some embodiments, the support arm 15 is pivotally attached 24 to the vertical member 12. This allows the support arm 15 to be movable between a collapsed position parallel to the vertical supports 12 and a deployed position extending perpendicularly outwardly from the vertical supports 12. A locking mechanism such as a ball detent, set screw, or other similar device may be utilized to maintain the support arm 15 in either the deployed position or the collapsed position. The support art 15 can connect to an interior side of the vertical support 12 such that it collapses downwardly to be contained between the pair of vertical supports 12, which allows for more compact storage of the device. However, the attachment point or pivot point 24 of the support arm 15 is not intended to be limited to one area, and the support arm 15 can be attached in a variety of ways, be pivotally adjustable, or be fixed.

Figure 4:
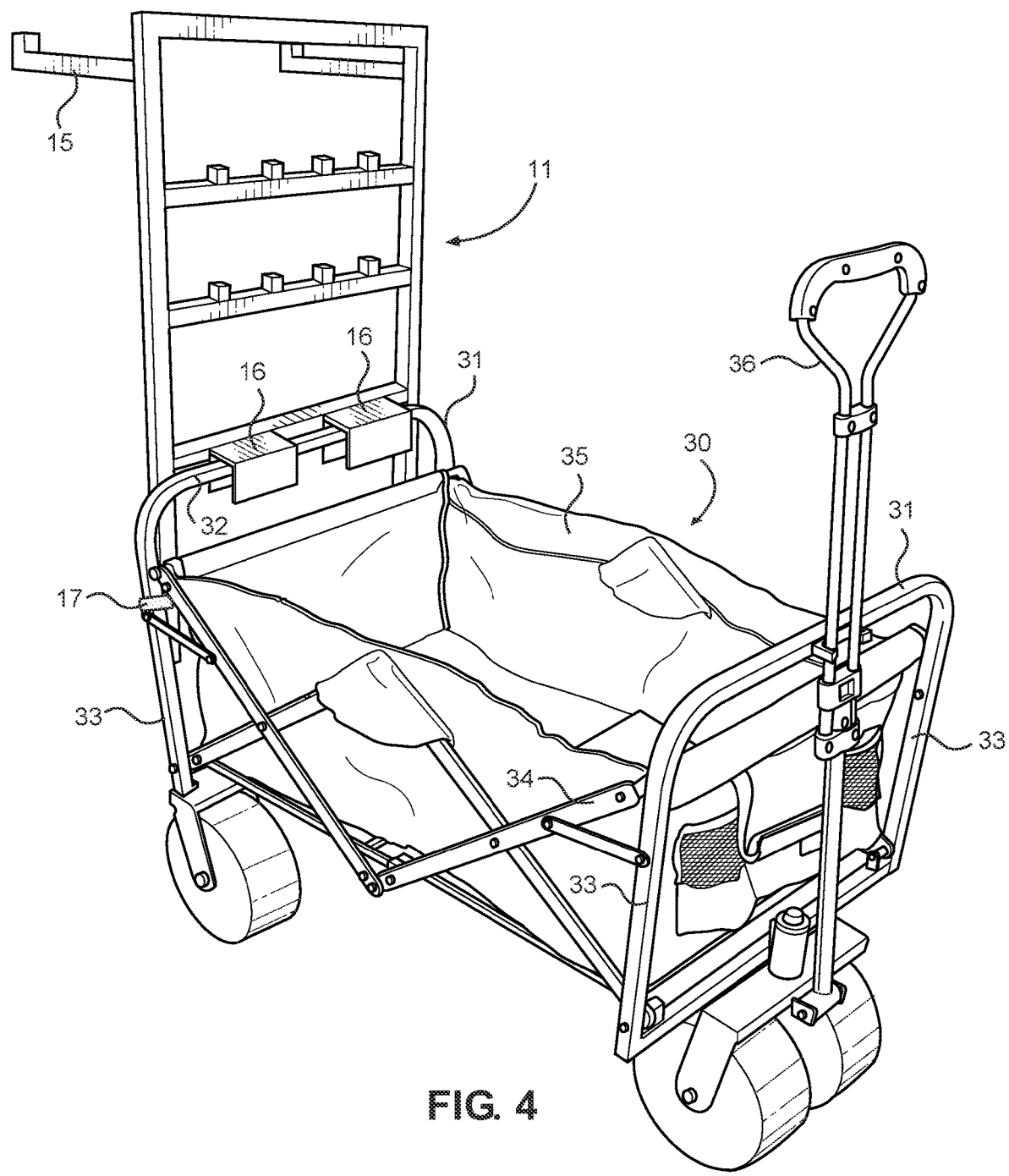
FIG. 4 shows a perspective view of an embodiment of the folding utility cart accessory device removably secured to a folding utility cart.

Referring now to FIG. 4, there is shown a perspective view of an embodiment of the folding utility cart accessory device removably secured to a folding utility cart. A general example of a folding utility cart is presented. Generally, such folding utility carts 30 include a pair of end frames 31 that are connected by an expandable and collapsible scissoring-type central support frame 34. The overall shape of the flexible storage container 35 is generally defined by the end frames 31 and the collapsed or expanded state of the central support frame 34. Each end frame 31 includes an upper horizontal member 32 connecting to a pair of vertical members 33 which defines the general structure of the end frames 31. A handle 36 at one end of the cart allows for the cart to be pulled or pushed in transport.

In order to attach the frame 11 of the accessory device to the folding utility cart 30, the first pair of fasteners 16 are configured to removably secure to the upper horizontal member 32 of a folding utility cart end frame 31. This provides a general mounting point and support for the frame 11. Further, the second pair of fasteners 17 are configured to removably secure to the vertical members 33 of the folding utility cart end frame 31. The straps wrap around the vertical members 33 to further secure the frame 11 in place and prevent it from moving or falling off as the folding utility cart 30 is in transport. Further, in the shown embodiment, the support arms 15 extend in a direction opposing the first pair of fasteners 16. This allows items to be secured to the support arms without hanging into and potentially obscuring the utility cart storage area 35.

Figure 5:
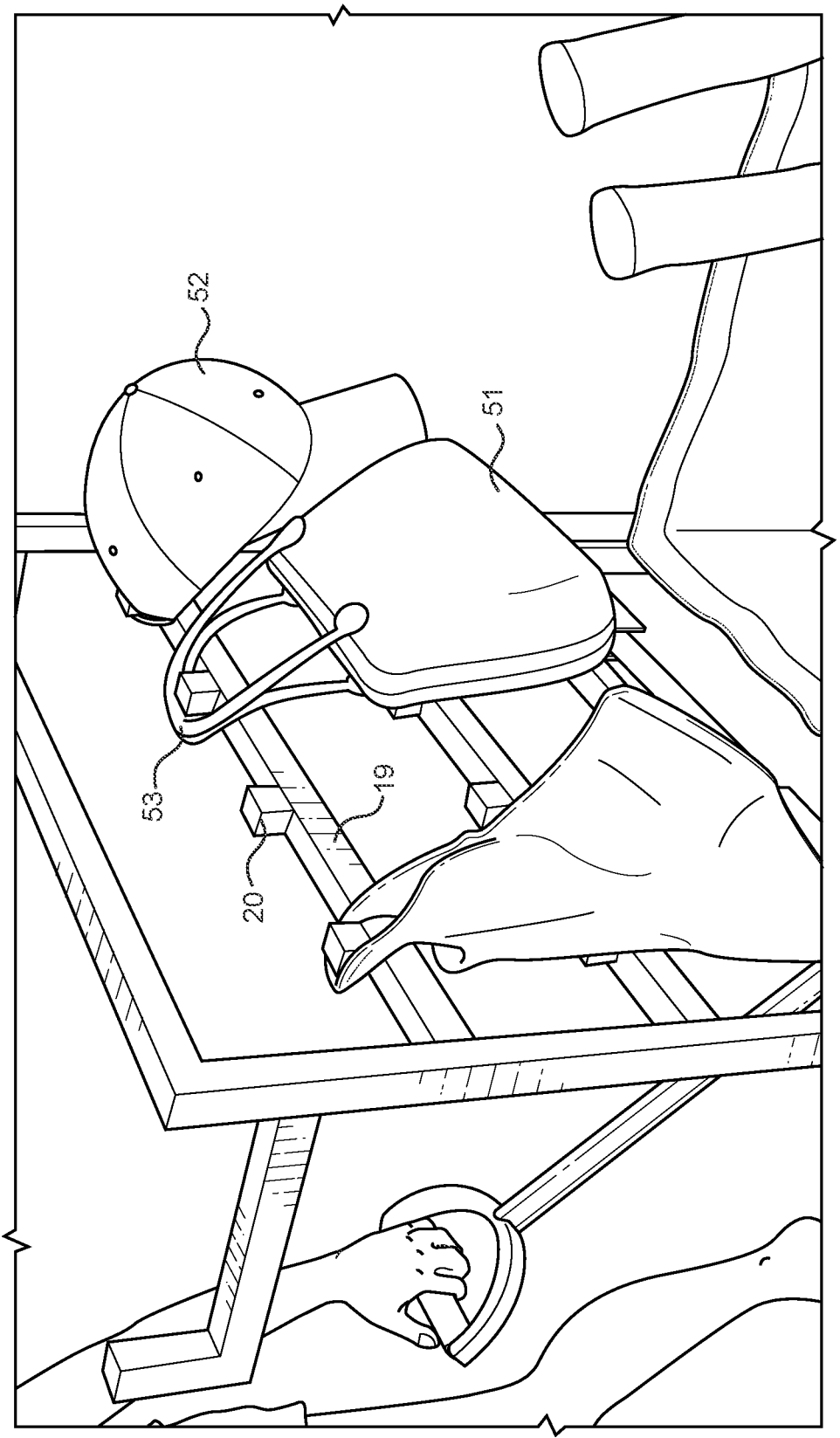
FIG. 5 shows a perspective view of the retaining elements of an embodiment of the folding utility cart accessory device.

Referring now to FIG. 5, there is shown a perspective view of the retaining elements of an embodiment of the folding utility cart accessory device. The retaining elements 20 can be utilized to hang any desired item that can be supported on the device. For example, a hat 52 may be hung from the retaining element 20, or a strap 53 of a bag 51. The retaining elements 20 are positioned along the middle horizontal member 19 such that enough space is provided for hanging individual items.

Figure 6:
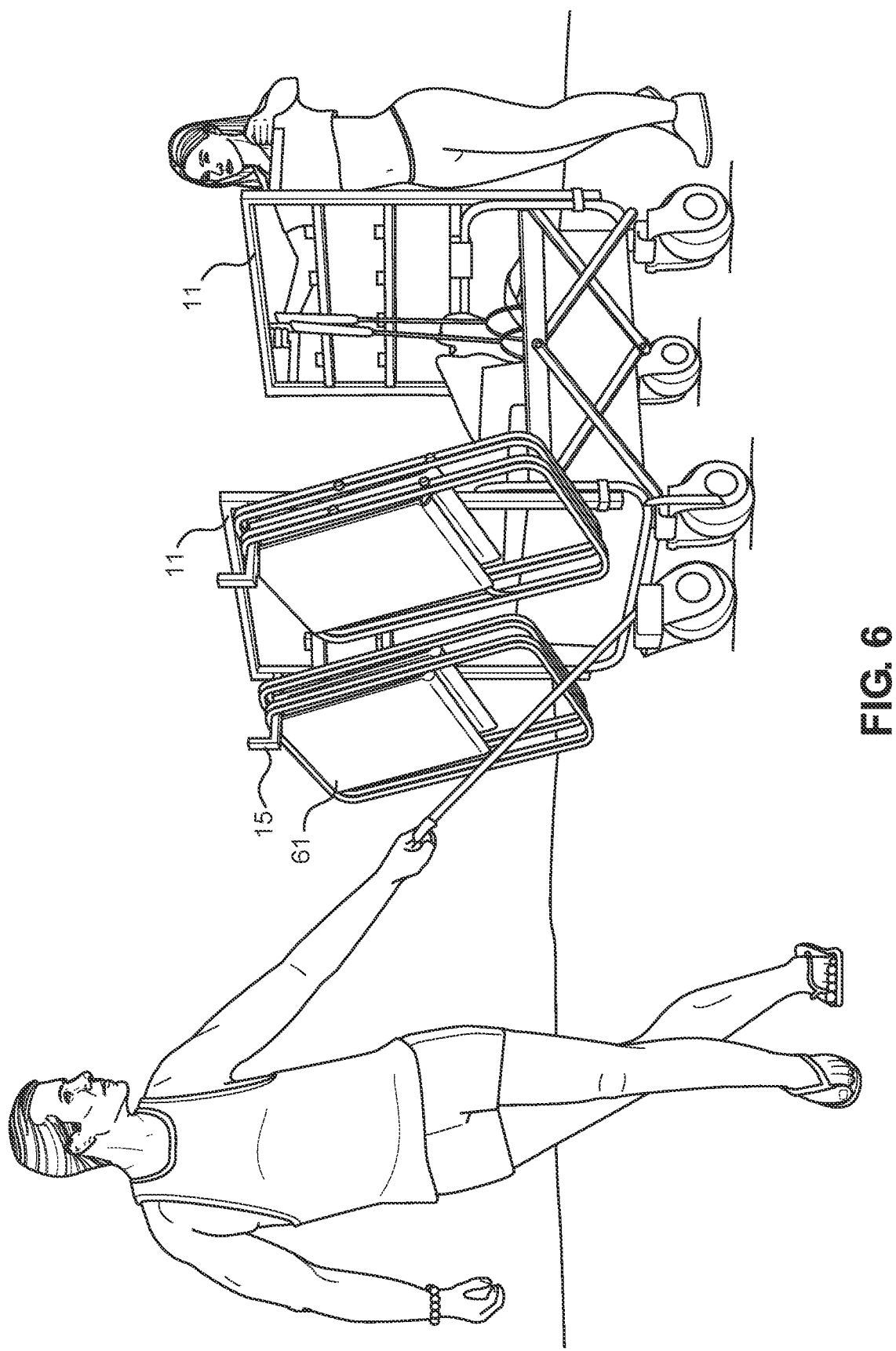
FIG. 6 shows a perspective view of an embodiment of the folding utility cart accessory device in use.

Referring now to FIG. 6, there is shown a perspective view of an embodiment of the folding utility cart accessory device in use. As shown, the accessory device frame 11 can be secured to either end or both ends of the folding utility cart, because its operation does not interfere with the utility cart handle. The frame 11 that is secured to the end of the cart opposing the handle can also provide additional handles by way of the support arms 15, allowing another user to assist with pushing or pulling a heavier cart. The opposing support arms 15 can be utilized to hang a plurality of chairs 61 or other objects, which allows the user to transport and store additional items with the folding utility cart outside of its main storage area.

While the present invention is shown utilized with one example type of folding utility cart, it should be understood that the present invention is not limited to operating with a single type of folding utility cart. The present invention can function with different shapes, sizes, and types of utility carts, including such carts that do not have folding capabilities. As long as a utility cart includes a first portion which can connect to the first pair of fasteners and second portion that can connect to the second pair of fasteners, the present invention will be compatible for use with that utility cart.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A folding utility cart accessory device, consisting of:
   a frame comprising a pair of vertical supports and an upper horizontal member extending between an upper end of each vertical support;
   a pair of support arms attached to the frame;
   a first pair of fasteners attached to a lower horizontal member extending between each vertical support;
   a second pair of fasteners attached to a lower end of each vertical support;
   wherein the first pair of fasteners are configured to removably secure to an upper horizontal member of a folding utility cart frame;
   wherein the second pair of fasteners are configured to removably secure to a vertical member of the folding utility cart frame;
   further comprising one or more middle horizontal members extending across the pair of vertical supports between the upper horizontal and the lower horizontal member;
   wherein the one or more middle horizontal members comprise a plurality of hanging elements attached thereto;
   wherein each hanging element includes a projection extending upwardly from an upper surface of one of the one or more middle horizontal members;
   wherein the first pair of fasteners comprises a pair of clamps having an open lower end that is configured to receive a horizontal member of the folding utility cart frame;
   wherein each fastener of the second pair of fasteners includes one or more straps;
   wherein the one or more straps comprise a hook and loop material;
   wherein each support arm comprises a retaining element attached to a distal end thereof; and
   wherein each retaining element comprises a retaining member extending upwardly from an upper surface of one of the support arms.

2. A folding utility cart accessory device, consisting of:
   a frame comprising a pair of vertical supports and an upper horizontal member extending between an upper end of each vertical support;
   a support arm pivotally attached to each of the vertical supports, wherein each support arm is movable between a collapsible position parallel to the vertical supports and a deployed position extending perpendicularly outwardly from the vertical supports;
   a first pair of fasteners attached to a lower horizontal member extending between each vertical support;
   a second pair of fasteners attached to a lower end of each vertical support;
   wherein the first pair of fasteners are configured to removably secure to an upper horizontal member of a folding utility cart frame;
   wherein the second pair of fasteners are configured to removably secure to a vertical member of the folding utility cart frame;
   further comprising one or more middle horizontal members extending across the pair of vertical supports between the upper horizontal and the lower horizontal member;
   wherein the one or more middle horizontal members comprise a plurality of hanging elements attached thereto;
   wherein each hanging element includes a projection extending upwardly from an upper surface of one of the one or more middle horizontal members;
   wherein the first pair of fasteners comprises a pair of clamps having an open lower end that is configured to receive a horizontal member of the folding utility cart frame;
   wherein each fastener of the second pair of fasteners includes one or more straps;
   wherein the one or more straps comprise a hook and loop material;
   wherein each support arm comprises a retaining element attached to a distal end thereof; and
   wherein each retaining element comprises a projection extending upwardly from an upper surface of one of the support arms.

* * * * *